(No Model.)
S. R. ASHLEY.
NAIL PULLING ATTACHMENT FOR CLAW HAMMERS.
No. 603,228. Patented Apr. 26, 1898.
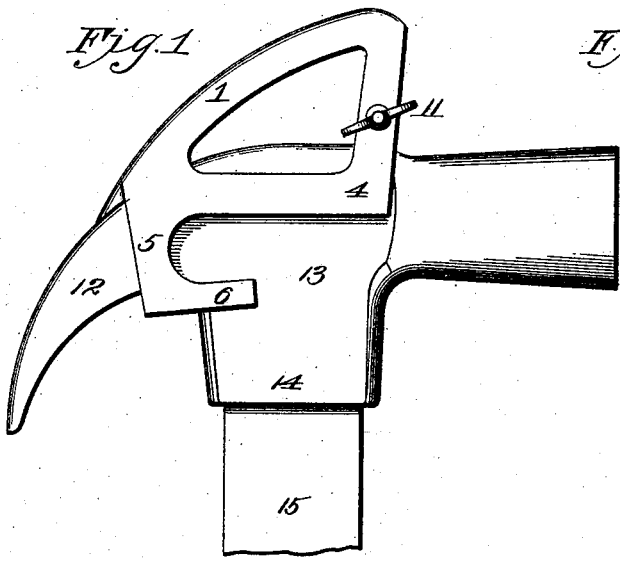
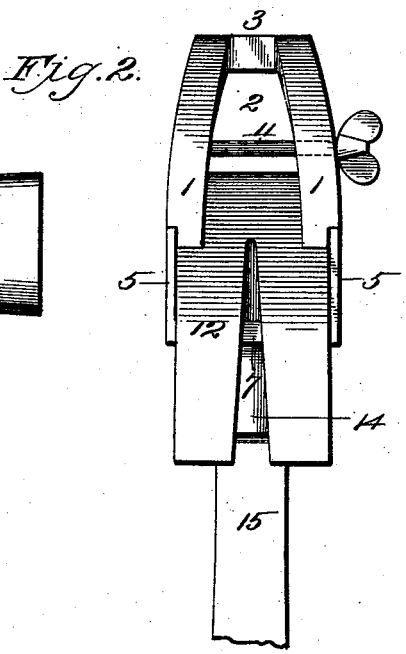
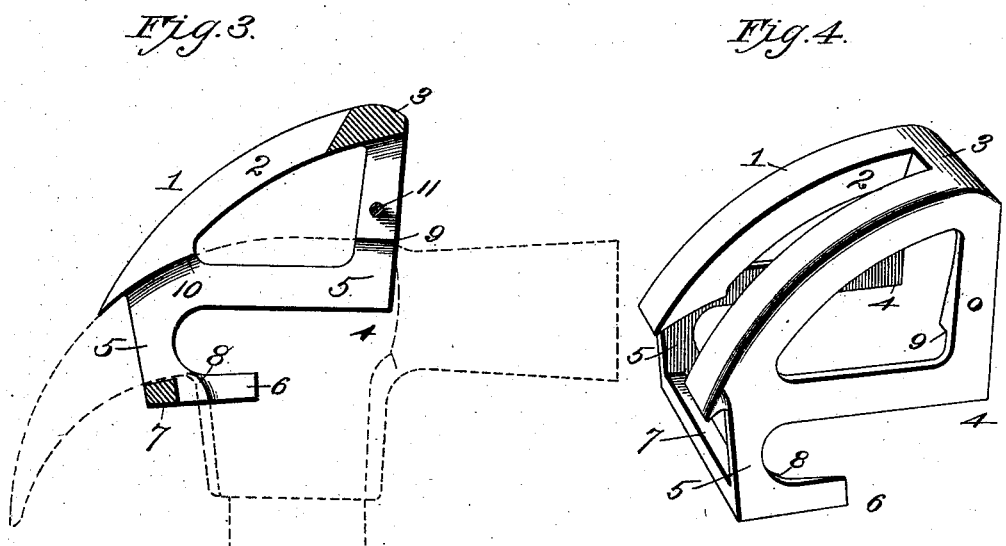
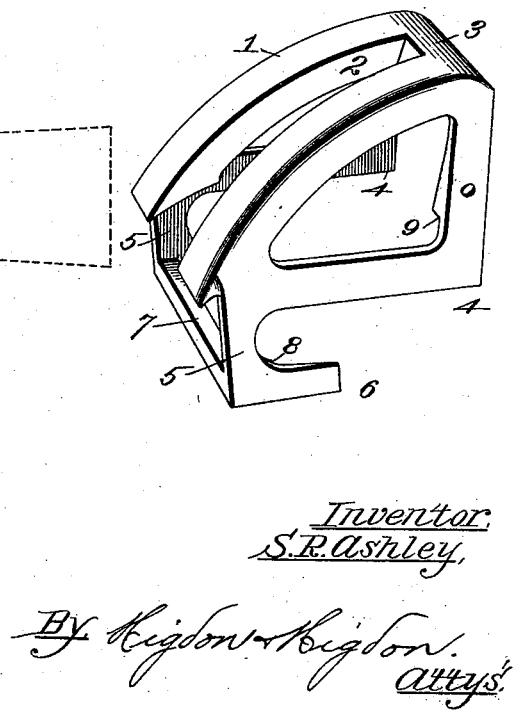
Witnesses:
M. R. Remley,
J. C. Thorpe.
Inventor:
S. R. Ashley,
By Higdon & Higdon,
Attys.

UNITED STATES PATENT OFFICE.

SILAS R. ASHLEY, OF CENTRALIA, MISSOURI, ASSIGNOR OF ONE-HALF TO EDWARD J. SCHMIDT, OF SAME PLACE.

NAIL-PULLING ATTACHMENT FOR CLAW-HAMMERS.

SPECIFICATION forming part of Letters Patent No. 603,228, dated April 26, 1898.

Application filed December 11, 1897. Serial No. 661,493. (No model.)

*To all whom it may concern:*

Be it known that I, SILAS R. ASHLEY, of Centralia, Boone county, Missouri, have invented certain new and useful Improvements in Nail-Pulling Attachments for Claw-Hammers, of which the following is a full, clear, and exact description, reference being had to the accompanying drawings, forming a part thereof.

My invention relates to nail-pulling attachments for claw-hammers; and my object is to produce a device of this character whereby a large-sized nail may be easily and quickly extracted without its being bent in the operation.

A further object is to produce a device of this character which is simple, strong, durable, and inexpensive of construction, which can be easily placed in or removed from position upon the hammer, and which increases the weight of the latter sufficiently to dispense with the use of a hatchet for driving large-sized nails.

To these ends the invention consists in certain novel and peculiar features of construction and combinations of parts, as will be hereinafter described and claimed.

In order that the invention may be fully understood, I will proceed to describe it with reference to the accompanying drawings, in which—

Figure 1 represents in side elevation a claw-hammer provided with a nail-pulling attachment embodying my invention. Fig. 2 represents an edge view of the same. Fig. 3 represents a vertical longitudinal section of the attachment, the hammer being shown in dotted lines. Fig. 4 is a perspective view of the attachment.

The attachment is preferably constructed of a single piece of spring metal and is of the form shown most clearly in Fig. 4—that is to say, it consists of an arched portion divided into a pair of approximately parallel claws 1 by the longitudinal bifurcation or slot 2, through which the shank of the nail in practice extends. Said slot or bifurcation 2 extends from the front edge of the claw nearly to its rear edge, so as to provide a connecting or cross bar 3 at the rear ends of the claws 1. Each claw is provided with a vertically-depending or approximately vertically-depending arm 4 in the form of a right angle, the opposite ends of which are united integrally with the opposite ends of said claws, and the front ends of the horizontal members of said angle-arms are provided with the vertically-depending and rearwardly-disposed angle arms or hooks 5, which are preferably beveled rearwardly and outwardly at their inner sides, at 6, so as to embrace with a wedge-like action the shank of the hammer, as presently referred to.

The angle arms or hooks 5 are united at their corners by the cross-bar 7 at some distance below the free ends of the claws, so as to form, in conjunction with certain shoulders, to be presently described, a recess or opening to receive the claw of the hammer. The said angle arms or hooks are also provided with the shoulders 8 at their inner sides to bear squarely against the front edge of the hammer-shank. The angle-arms 4 are also provided at their inner sides with a pair of downwardly-disposed shoulders 9 to bear squarely and firmly upon the upper side of the head of the hammer, while the free ends of the claws 1 project inwardly of the arms 5, so as to overlap and bear squarely, as shoulders 10, upon the claw portion of the hammer at opposite sides of the slot or bifurcation of said claw.

Just above the shoulders 9 the vertical members of the angle-arms 4 are connected by a clamping-bolt 11, which extends loosely through one arm and engages a threaded opening in the other, in order that said arms may be clamped with a firm and unyielding pressure upon opposite sides of the head of the hammer.

To secure the attachment in the proper position upon a claw-hammer of proper size, the claw 12 of the latter is projected forwardly through the recess or opening between the cross-bar 7 and shoulders 10 of the attachment until such movement is terminated by the engagement of the shoulders 9 and 10 with the head and claws of the hammer and the shoulders 8 with the shank of the hammer, as shown most clearly in Fig. 3. It will be understood, of course, that the attachment does not slip freely and easily to the position described, but that some pressure is required in manipulation owing to the fact that there is frictional engagement between the arms 4 and 5 of the attachment and the side of the head and shank of the hammer. When such position has been attained, however, it will require an exceedingly heavy blow to dislodge it, owing to the fact that it must follow the line described by the curve of the claw before it can be either placed in or removed from position. To insure that it retains its position, however, I provide the clamping-bolt 11, hereinbefore described, whereby the arms 4 may be clamped tightly and unyieldingly against the hammer-head. When the attachment is secured in such position, it is obvious that the arched or claw portion forms an almost unbroken or uniform curve from the point of the hammer-claw to the heel or rear end of the attachment, which, being located at a much greater relative distance from the center from which the curve of the hammer-claw is struck, renders the extraction of long and heavy nails much easier than with the hammer-claw alone. It therefore facilitates and renders their extraction easier, owing to the fact that a much greater leverage is obtained upon the nail, and as a consequence there is much less strain upon the handle 15 of the hammer at its weakest point—viz., at its junction with the hammer-shank, the point where handles are most frequently broken.

It will be furthermore observed that owing to the increased weight which this attachment gives the hammer it may be used in heavy work in lieu of a hatchet.

Having thus described the invention, what I claim as new, and desire to secure by Letters Patent, is—

1. A bifurcated nail-pulling attachment for claw-hammers, provided near its front end with downwardly-disposed shoulders 10, and below the same with a cross-bar 7, said shoulders and cross-bar providing between them a recess or opening adapted to snugly receive the claw portion of the hammer, substantially as described.

2. A bifurcated arched nail-pulling attachment for claw-hammers, provided near its front end with downwardly-disposed shoulders 10, and below the same with a cross-bar 7, and at its rear end with downwardly-disposed shoulders to bear upon the head of the hammer, substantially as described.

3. A bifurcated arched nail-pulling attachment for claw-hammers, provided near its front end with downwardly-disposed shoulders 10, and below the same with a cross-bar 7, and at its rear end with depending arms to embrace the sides of the hammer-head, and shoulders upon said arms, to bear upon said hammer-head, substantially as described.

4. A bifurcated arched nail-pulling attachment for claw-hammers, provided near its front end with downwardly-disposed shoulders 10, and below the same with a cross-bar 7, and at its rear end with depending arms to embrace the sides of the hammer-head, shoulders upon said arms to bear upon said hammer-head, and a device for clamping said arms firmly against the opposite sides of the hammer, substantially as described.

5. A nail-pulling attachment for claw-hammers, comprising a bifurcated arched portion having near its front end side arms adapted to embrace the shank of the hammer, and shoulders to bear upon the claw thereof; said arms being connected by a cross-bar adapted to fit in the crotch at the junction of the hammer claw and shank, substantially as described.

6. A nail-pulling attachment for claw-hammers, comprising a bifurcated arched portion having at its front end downwardly-disposed shoulders to bear upon the curved surface of a hammer-claw, depending side arms connected by a cross-bar below said shoulders so as to form a recess or opening to receive the hammer-claw, rearwardly-disposed arms formed integral with the first-named arms and adapted to embrace the sides of the hammer-shank, and provided with shoulders which bear against the front edge of said hammer-shank; said arched portion being provided also with depending arms which embrace the hammer-head, substantially as described.

In testimony whereof I affix my signature in the presence of two witnesses.

SILAS R. ASHLEY.

Witnesses:
WM. A. MCCALLISTER,
J. H. SHOCK.